Nov. 27, 1928.
A. W. COPLEY ET AL
1,693,574
SYSTEM OF DISTRIBUTION
Original Filed Nov. 7, 1917
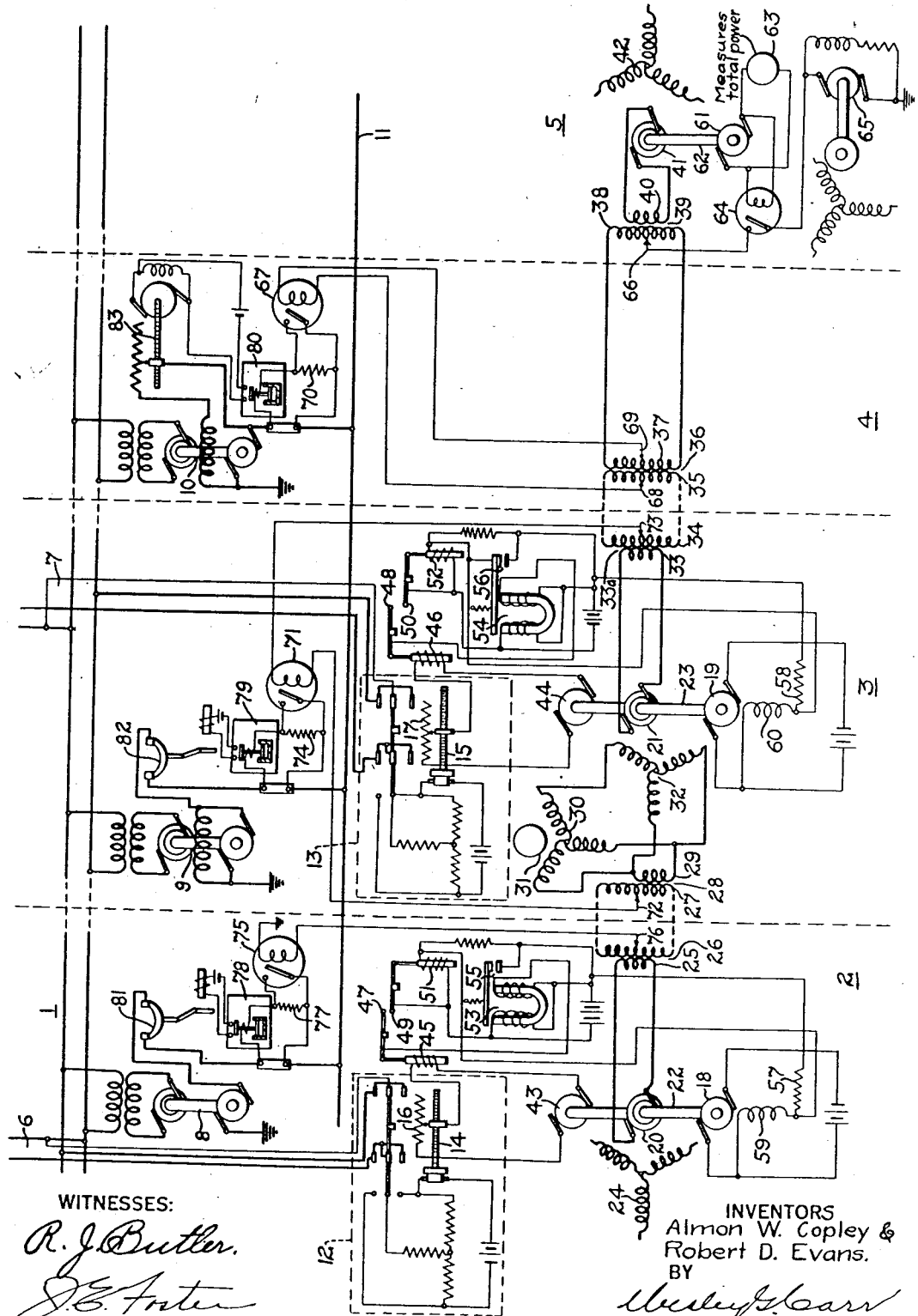
WITNESSES:
R. J. Butler.
J. E. Foster
INVENTORS
Almon W. Copley &
Robert D. Evans.
BY
Wesley J. Carr
ATTORNEY Patented Nov. 27, 1928.

1,693,574

UNITED STATES PATENT OFFICE.

ALMON W. COPLEY, OF SAN FRANCISCO, CALIFORNIA, AND ROBERT. D. EVANS, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF DISTRIBUTION.

Original application filed November 7, 1917, Serial No. 200,664. Divided and this application filed May 28, 1923 Serial No. 641 872.

Our invention relates to regulating systems and particularly to regulating systems that may be employed with such distributing and measuring systems as are illustrated in our copending application Serial No. 200,664, filed Nov. 7, 1917, Patent No. 1,543,697, dated June 30, 1925, systems of distribution, of which this application is a division.

One object of our invention is to provide means for limiting the power input into a distributing circuit when the total power supplied to its supply circuit, at widely separated points, exceeds a predetermined value.

Another object of our invention is to provide means for regulating the power input into a distributing circuit at widely separated locations in accordance with the total load demand thereon.

Another object of our invention is to provide means for selectively limiting the output of transforming means that are connected between the supply and distributing circuits of a system of the above indicated character.

Another object of our invention is to provide means whereby the sum of the power supplied to a circuit, at widely separated points, may be indicated through a single-phase transmission circuit, at any desired point without the errors heretofore incidental to transmission losses.

A further object of our invention is to provide a system of the above indicated character that shall be simple and effective in its operation.

Copending application Serial No. 200,034, filed Nov. 3, 1917, by Robert D. Evans and patented October 28, 1924, No. 1,513,232, discloses a system of generating voltages having frequencies proportional to the energy supplied to a supply circuit and means for combining the frequencies of the various voltages for the purpose of indicating a value that is proportional to the summation of the power to be measured. Such systems require a polyphase transmission system.

In our present invention, we utilize the broad principle set forth in the above indicated application and transmit the voltages by a single-phase transmission system. This ordinarily would not be feasible and, in view of this, we utilize phase converters to transform the single-phase voltages to polyphase voltages at the various dynamos. We further provide means whereby, when the total power supplied to the supply circuit exceeds a predetermined value, a continuous current will be transmitted through the measuring system to cooperate with inverse time-limit relays to cause the load on the various substations of the circuit to be successively reduced in a predetermined order.

The single figure of the accompanying drawing is a diagramamtic view of a system of distribution embodying our invention.

A supply circuit 1 connects stations 2, 3, 4 and 5 and is provided, at predetermined points, with feeder circuits 6 and 7 for supplying power thereto. The stations 2, 3, and 4 may be considered substations and are provided with transforming devices 8, 9 and 10, such as motor-generator sets. The motor-generator sets 8, 9 and 10 are connected between the supply circuit 1 and a distributing circuit 11.

Kelvin balances or other power-responsive devices 12 and 13 are adapted to measure the power supplied by the feeder circuits 6 and 7, respectively, to the supply circuit 1 and are adapted to control movable contact members 14 and 15 that engage resistors 16 and 17, respectively. The positions of the contact members 14 and 15 with respect to the resistors 16 and 17, so control the speed of motors 18 and 19 and dynamos 20 and 21, which are mounted on shafts 22 and 23 with the motors 18 and 19, respectively, that voltages are induced in the secondary windings of the same which vary in accordance with the power traversing the circuits 6 and 7, respectively.

The primary winding 24 of the dynamo 20 is operatively connected to a source of direct-current or to a source of alternating-current electromotive force having a known frequency. The secondary winding of the dynamo 20 is connected to the primary winding 25 of a transformer, the secondary winding 26 of which is connected to the primary winding 27 of a transformer 28 in the substation 3. The secondary winding 29 of the transformer 28 is connected to the stator windings 30 of a phase converter 31 and to the primary winding 32 of the dynamo 21. The secondary winding of the dynamo 21 is connected to the primary winding 33 of a transformer 33ª, the secondary winding 34 of which is connected to the primary winding 35 of the transformer 36 in the substation 4. The secondary winding 37 of the transformer 36 is connected to the primary winding 38 of a transformer 39 in the dispatcher or control station 5. The secondary winding 40 of the transformer 39 is connected to the secondary winding of a motor 41, the primary winding 42 of which is connected to a source of direct-current or a source of alternating-current electromotive force having a known frequency, preferably the same as that of the electromotive force applied to the primary winding 24 of the dynamo 20.

Magnetos 43 and 44 are mounted on the shafts 22 and 23, respectively, and are adapted to be connected, through the winding of electromagnets 45 and 46, to the resistors 16 and 17, respectively. The electromagnets 45 and 46 are adapted to control contact members 47 and 48 that cooperate with contact members 49 and 50 for the purpose of controlling the motors 18 and 19. The contact members 49 and 50 are periodically actuated by electromagnets 51 and 52, as is the usual practice in voltage regulators. Relays 53 and 54 are adapted to be controlled by the contact members 47 and 49 and 48 and 50 for the purpose of actuating contact members 55 and 56 that control the insertion of resistors 57 and 58 in the circuits of the respective field windings 59 and 60 of the motors 18 and 19.

Since a voltage having a known frequency is applied to the winding 24 of the dynamo 20, the voltage applied to the primary winding 32 of the dynamo 21 will be equal to the sum of the frequency of the voltage applied to the winding 24 and the frequency of the voltage generated by the dynamo 20 by reason of its rotation. Similarly, the frequency applied to the primary winding 38 of the transformer 39 will be equal to the sum of the frequency of the voltage applied to the winding 24 and that generated by the dynamos 20 and 21 by reason of their rotation. Since, for purpose of illustration, polyphase voltage of known frequency is applied to the primary winding 42 of the motor 41, and the frequency of the voltage applied to the secondary winding of the motor 41 is equal to the sum of the applied frequency and the frequency generated, by reason of the rotation of the dynamos 20 and 21, the motor 41 will be actuated at a speed directly proportional to the summation of the frequencies generated by reason of the rotation of the dynamos 20 and 21 and the frequency of the voltage applied to the winding 24 less the frequency of the voltage applied to the winding 42. If the frequencies of the voltages applied to the winding 24 of the dynamo 20 and the winding 42 of the motor 41 are equal or, if direct current is applied thereto, the speed of rotation of the motor 41 will be proportional to the sum of the speeds of the dynamos 20 and 21, and, consequently, a direct-current generator 61 that is mounted upon the shaft 62 with the motor 41 will generate a voltage proportional to the power supplied to the circuit 1 from the feeder circuits 6 and 7. A voltmeter 63 may be connected across the terminals of the generator 61 to indicate the summation of the power supplied to the circuit 1.

As it is desirable to keep the dynamos 20 and 21 rotating even when no energy traverses the feeder circuits 6 and 7, the regulating relays may be adjusted for a definite speed to correspond to the no-load condition and the change of speed above this value will then be proportional to the power supplied. If power is regenerated, the dynamos will be retarded and their speeds reduced below the no-load speed. The motor 41, will in this case, run at a speed that is the summation of the speeds of the dynamos 20 and 21 including the no-load speeds. Therefore, the sum of the no-load speeds must be subtracted from the speed of the motor 41, the remainder being proportional to the total net power supplied to the system.

A relay 64 is operatively connected across the terminals of the generator 61 and is adapted to control a circuit from a source 65 of direct current to the mid-point 66 of the primary winding 38 of the transformer 39. A relay 67 is connected across mid-points 68 and 69 on the windings 35 and 37 of the transformer 36 and is adapted to short circuit a resistor 70 when the total power supplied from the circuit 1 exceeds a predetermined value, as indicated by the meter 63, or, in other words, when the relay 64 is actuated. Similarly, a relay 71 is connected between the mid-point 72 of the winding 27 of the transformer 28 and the mid-point 73 of the secondary winding 34 of the transformer 33ª. The relay 71 is adapted to short circuit a resistor 74 under similar predetermined conditions. A relay 75 is connected from ground to the mid-point 76 of the secondary winding 26. The relay 75 is adapted to short circuit a resistor 77, under predetermined conditions.

Relays 78, 79 and 80 are connected to the current shunts of the generators of the motor-generator sets 8, 9 and 10, respectively, and in series with the respective resistors 77, 74 and 70. The relays 78, 79 and 80 are each adapted to operate at the end of a time interval that will vary inversely as the current traversing the same after the respective resistors 77, 74 and 70 have been short circuited. Thus, when the energy supplied to the circuit 1 exceeds a predetermined value, the relays 78, 79 and 80 are energized and the one connected to the substation that is supplying the greatest amount of energy to the circuit 11 is actuated first to either disconnect the substation from the circuit 11 or to reduce the voltage of, and, consequently, the load on, the substation. If the total amount of energy supplied to the circuit 1 is not reduced after the first substation is either disconnected or the energy output of the same is decreased, the next most highly loaded substation will be disconnected, and, similarly, each substation will be disconnected or its power output limited in accordance with the load traversing the same, so long as the energy supplied to the circuit 1 exceeds a predetermined value.

Circuit interrupters 81 and 82 have been provided in the substations 2 and 3 as illustrative of means for disconnecting the generators from the circuit 11 when the power supplied to the circuit 1 exceeds a predetermined value and a motor-operated rheostat 83 is provided in substation 4 as illustrative of means for reducing the voltage of the generator when the power supplied to the circuit 1 exceeds a predetermined value. Since the relay that is connected to the most heavily loaded generator will operate first, the proper sequence in either disconnecting or reducing the voltage of the generators is insured.

Since the frequency of the voltages generated by the dynamos 20 and 21 and transmitted through the various transformers of the measuring system is independent of the electrical characteristics of the circuit, changes in temperature, resistance and leakage of the conductors does not affect the indications, and the system will be accurate under all conditions.

Our invention is not limited to the particular devices illustrated, as various modifications may be made therein without departing from the spirit and scope of the invention as set forth in the appended claims.

We claim as our invention:

1. In a power system, the combination with a power-distribution circuit, a source of energy, a translating apparatus for converting the energy from said source to electrical energy of the kind supplied by the distribution circuit and switching equipment for controlling the connection of the apparatus to the distribution circuit, of an auxiliary control circuit, a frequency-responsive device connected thereto, means for subjecting the auxiliary circuit to an electromotive force having a predetermined frequency sufficient to operate the device when the load on the distribution circuit attains substantially a predetermined value, and means responsive to the frequency-responsive device for controlling the connection-controlling switching equipment.

2. In a power system, the combination with a distribution circuit and a plurality of translating apparatus for supplying energy to the circuit at predetermined points of the system, of means associated with each apparatus for controlling the translation of energy to the distribution circuit, an auxiliary control circuit, a control relay energized in accordance with the frequency of the electromotive force applied to the control circuit, means controlled by the relay for controlling the energy-translation controlling means and means for energizing the control circuit with an electromotive force having a frequency dependent upon a predetermined load on the distribution circuit for controlling the operation of the control relay.

3. In a power system, the combination with a transmission line, a translating apparatus and a circuit-controlling device for connecting the apparatus to the line, of a control relay, a circuit for controlling the operation of the relay, means for impressing an electromotive force on the circuit having substantially a predetermined frequency when the total load on the line attains substantially a predetermined value and means responsive to the actuation of the relay at such predetermined frequency of the circuit voltage for effecting the actuation of the circuit-controlling device.

4. In a power-distribution system, the combination with a main transmission line, a plurality of dynamo-electric machines and connecting means between the machines and the line, of a control relay, an auxiliary circuit for controlling the operation of the relay, means for energizing said circuit to produce an electromotive force therein, the frequency of which depends upon the total load on the transmission line, and means controlled by the relay for controlling the operation of the connecting means.

5. The combination with a distribution circuit and a dynamo-electric machine for supplying energy thereto, of a control circuit, means for energizing the control circuit with an electromotive force having a frequency dependent upon the load on the distribution circuit, means operative in response to a predetermined frequency in the control circuit and means controlled by said frequency-responsive means for controlling the supplying of energy to the distribution system by the dynamo-electric machine.

6. The combination with a distribution circuit and a dynamo-electric machine for supplying energy thereto, of a control circuit, means for energizing the control circuit with an electromotive force having a frequency dependent upon the load on the distribution circuit, and means operative in response to a predetermined frequency in the control circuit for controlling the transmission of energy from the dynamo-electric machine to the distribution circuit.

7. The combination with a power system embodying a main transmission line and a plurality of associated dynamo-electric machines, of means for controlling the traversal of energy between the transmission line and the machines, a frequency-responsive device, an auxiliary circuit for energizing the frequency-responsive device with a predetermined frequency when the total load on the system attains a predetermined value, and means controlled by the frequency-responsive device for controlling the energy-traversal-controlling means.

8. In a distribution system, a supply circuit having widely separated feeders, a common distribution circuit, a plurality of separated translating devices connected to said feeders and said distribution circuit, means for reducing the loads on said translating devices when the total load demand exceeds a predetermined value, and means including an independently operable relay for rendering the last-mentioned means effective with respect to the translating devices in sequence depending upon the loads thereon.

9. In a distribution system, an alternating-current supply circuit, a direct-current distribution circuit, a plurality of converter substations, a plurality of rotary converters therein connected between said supply and distribution circuits, means for limiting the loads on said converters when the total load demand exceeds a predetermined value, and means including an independently operable relay for rendering said limiting means effective successively in the respective substations depending upon the load on each substation.

10. In a distribution system, a supply circuit, a plurality of translating devices connected thereto, means for reducing the loads on said devices when the total load demand on said supply circuit exceeds a predetermined value, means including a time-element relay associated with each device for rendering the last-mentioned means effective, and means whereby the operating time of said relays depends upon the loads upon the associated devices.

11. In a distribution system, a supply circuit, a plurality of translating devices connected thereto, means for measuring the loads on the respective translating devices, a totalizing device, conductors extending between said measuring means and said totalizing device, means for actuating said totalizing device over said conductors in accordance with the total load demand, and means including said conductors and totalizing device for controlling said translating devices in accordance with the total load.

12. In a distribution system, a plurality of translating devices, means for measuring the loads on the respective translating devices, a totalizing device, a control circuit extending between said measuring means and said totalizing device, means for actuating said totalizing device over said control circuit independently of variations in the resistance of the control circuit and means for controlling said translating devices over said control circuit.

13. In a distribution system, a plurality of translating devices, means for measuring the loads on the respective translating devices, a totalizing device, conductors extending between said measuring means and said totalizing device, means for actuating said totalizing device over said conductors and means including said conductors and totalizing device for reducing the load upon the heaviest loaded device.

14. In a distribution system, a plurality of translating devices, means for measuring the loads on the respective translating devices, a totalizing device, means for actuating said totalizing device in accordance with the total load on said translating devices and means including a time-element relay having its actuating winding controlled by said totalizing device for controlling one of said translating devices.

15. In a distribution system, a plurality of translating devices, means for measuring the loads on the respective translating devices, a totalizing device, conductors extending between said measuring means and said totalizing device, means for actuating said totalizing device over said conductors, a relay controlling the operation of one of said translating devices, and means including said totalizing device for operating said relay over said conductors when the total load exceeds a predetermined value.

16. In a distribution system, a supply circuit, a plurality of feeder circuits therefor, a distribution circuit, widely separated substations for supplying energy to the distribution circuit from the supply circuit, a totalizing device actuated in accordance with the total load on said feeder circuits, and means including said totalizing device for disconnecting said substations from the distribution circuit in a sequence depending upon the loads on the respective substations.

17. In a distribution system, a distribution circuit, a plurality of substations for supplying energy thereto, a relay responsive to the total load on said substations and means in each substation jointly controlled by said relay and by the load on the substation for controlling the substation.

18. In a distribution system, a distribution circuit, a plurality of substations for supplying energy thereto, a relay responsive to the total energy on said substations, and means for limiting the loads on the respective substations, said means being jointly controlled by the said relay and by the individual substation load.

19. In a distribution system, a plurality of substations for supplying a load, a totalizing device operated in accordance with the total system load, conductors extending between said substations and said totalizing device, means for actuating said totalizing device over said conductors and means in each substation jointly controlled by said totalizing device and by the load on the substation for controlling the substation.

20. In a distribution system, a plurality of substations for supplying a load, a totalizing device operated in accordance with the total system load, conductors extending between said substations and said totalizing device, means for actuating said totalizing device over said conductors and means controlled by said device over said conductors for limiting the total load on the substations.

21. In a distribution system, a supply circuit, a distribution circuit, a plurality of translating devices connected between said circuits, and means for reducing the load on said devices when the total load on the supply circuit exceeds a predetermined value, said means being only effective with respect to the most heavily loaded device provided the reduction of the load on this device reduces the total load below said value.

22. In a distribution system, a substation, an electrical translating device therein, a control circuit extending from said substation to a remote point, a second device connected to said control circuit at said remote point, means for operating said second device over said control circuit in accordance with the operation of said translating device, and means including said second device for automatically controlling said translating device over said control circuit under predetermined conditions.

23. In a distribution system, a substation, an electrical translating device therein, a control circuit extending from said substation to a remote point, a second device associated with said control circuit at said remote point, means for operating said second device over said control circuit in accordance with the load on said translating device, and means including said second device for controlling said translating device over said circuit in accordance with load conditions in the system.

24. In a distribution system, a plurality of substations, electrical translating devices therein, control conductors extending from said substations to a remote point, a device associated with said conductors at said remote point, means for controlling the same over said conductors, and means including said last-mentioned device for controlling said translating devices over said conductors.

25. In a distribution system, a substation, an electrical translating device therein, a control circuit extending from said substation to a remote point, a second device associated with said control circuit at said remote point, means for controlling said second device over said circuit, and means including said second device for disconnecting said translating device from the system.

26. In a distribution system, a substation, an electrical translating device therein, a circuit extending from said substation to a remote point, a measuring device associated with said circuit at said remote point, means for operating said measuring device over said circuit in accordance with the load on said translating device, and means including said measuring device for controlling the connection of said translating device to the system.

27. In a distribution system, a plurality of substations, translating devices therein, conductors extending from said substations to a remote point, a totalizing device associated with said conductors at said remote point, means for operating said totalizing device over said conductors in accordance with the total load on said translating devices, and means including said totalizing device for controlling said translating devices over said conductors.

28. In a distribution system, a plurality of substations, translating devices therein, a two-wire circuit connecting said substations in series, a device associated with said circuit, means for controlling the same over said circuit in accordance with the operation of said translating devices, and means including said last-mentioned device for controlling said translating devices in the several stations over said circuit.

29. In a distribution system, a plurality of substations, translating devices therein, a two-wire circuit connecting said substations in series, a totalizing device associated with said circuit, means for operating said totalizing device over said circuit in accordance with the total load on said translating devices and means including said totalizing device and effected over said circuit for limiting the loads on said translating devices in the several stations.

30. In a distribution system, a substation, a control circuit extending from said substation to a remote point, means for transmitting a varying current over said circuit to said remote point which fluctuates in accordance with the varying operation of said substation and means for controlling the operation of said substation over said control circuit from said remote point.

31. In a distribution system, a plurality of substations, a single circuit connecting said substations in series, means connected in said circuit for indicating an operating characteristic of the several substations, and means including said indicating means for controlling the operation of the substations over said circuit.

32. In a load-regulating system, the combination of a plurality of supply stations, indicating means for measuring the totalized load of the system, and means for regulating the electrical condition of the system, said last-named means being controlled by said load-indicating means.

33. In a load-regulating system, the combination of a plurality of supply stations for alternating-current circuits, means for totalizing the simultaneous loads on the supply stations, said means including a device in each station for generating a pulsating current corresponding to the load on said station and an instrument responsive to said devices, and means including said instrument for varying the loads on the stations in accordance with the total load.

34. In a load-regulating system, the combination of a plurality of supply stations, means for summating the power delivered by the stations, and means including said first-mentioned means for varying the load on one of the stations and, under different power conditions, for opening the supply circuit at another station.

35. In a load-regulating system, the combination of a plurality of supply stations, means for summating the power delivered by the stations in terms of frequency, and means controlled by said means for varying the load on the stations.

36. In a load-regulating system, the combination of a plurality of supply stations, means for summating the total power delivered by said stations in terms of frequency, a device operated in accordance with the delivered frequency, and means including said device for automatically controlling all of the supply stations.

37. In a load-regulator system, the combination of a plurality of supply stations, a pair of conductors connecting said stations, means for summating the power delivered by said stations and for transmitting the summation in terms of current frequency over said conductors, a control station, means in said control station controlled by the frequency of current received for transmitting controlling impulses over said conductors, and means responsive to said impulses for controlling said stations.

38. In a load-regulator system, the combination of a plurality of supply stations, a pair of conductors connecting said stations, means for summating the power delivered by the stations and for transmitting the summation in terms of frequency over said conductors, a device responsive to said frequency and means including said device for controlling the total power delivered by the supply stations.

39. In a regulator system, a supply circuit, a measuring device actuated in accordance with supply-circuit conditions, a pulstating-current generator controlled thereby, and means controlled by said device and generator for governing the load on said circuit.

40. In a regulator system, a supply circuit, a measuring device actuated in accordance with supply-circuit conditions, a pulsating-current generator controlled thereby, and means controlled by said device and generator for varying the electrical conditions in said circuit.

41. In a distribution system, a supply circuit, a plurality of translating devices connected thereto, means for reducing the load on each translating device, and means for controlling said load-reducing means comprising means severally responsive to the loads on the translating devices but normally ineffective to control the load-reducing means and means independent of the load-reducing means and operative when the total load demand on the translating devices exceeds a predetermined value for rendering the load responsive means effective to control the load-reducing means.

42. In a distribution system, a distribution circuit, a plurality of translating devices connected thereto, a relay responsive to the total load on said devices and means associated with each of said devices controlled jointly by said relay and by the load on each device, for controlling said device.

43. In a distribution system, a distribution circuit, a plurality of translating devices connected thereto, a relay responsive to the total load on said devices, and means for limiting the loads on the respective devices, said means being jointly controlled by said relay and by the load on the individual translating device.

In testimony whereof, we have hereunto subscribed our names this 18th day of May, 1923.

ALMON W. COPLEY.
ROBERT D. EVANS.